July 31, 1962   A. FORTIER   3,046,778
PNEUMATIC GAUGE

Filed Feb. 28, 1958   3 Sheets-Sheet 1

Inventor
A. Fortier
By Flecent Downing Seebold
Attys.

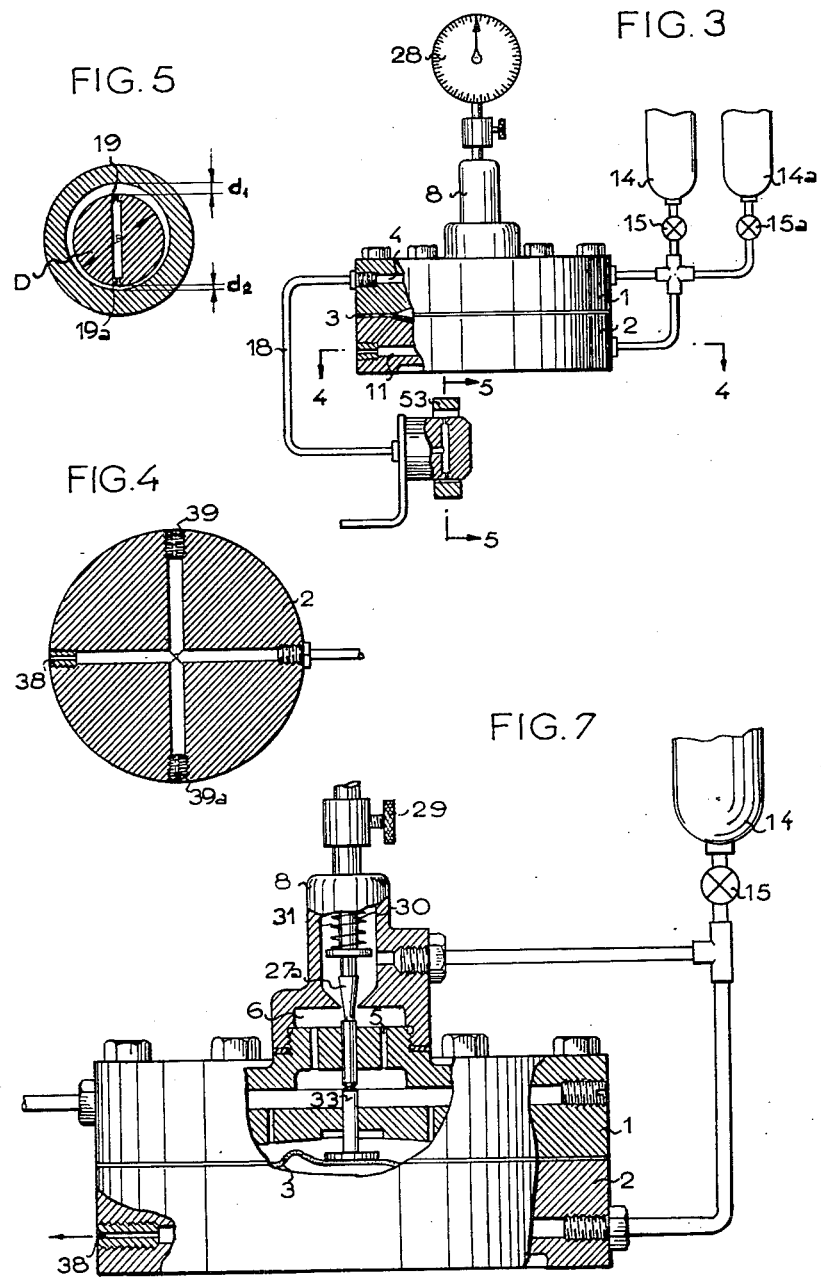

United States Patent Office 3,046,778
Patented July 31, 1962

3,046,778
PNEUMATIC GAUGE
André Fortier, 12 Rue Leon Cambillart, Clamart, France
Filed Feb. 28, 1958, Ser. No. 718,193
Claims priority, application France Mar. 6, 1957
9 Claims. (Cl. 73—37.5)

This invention relates to pneumatic gauges of the general kind having a gauging outlet to be disposed at a short distance from an object to be gauged to form therewith a variable passage through which a gas is blown out, whereby the gas pressure upstream the said outlet is a function of the distance between the latter and the said object. More particularly, the invention relates to pneumatic gauges of this general kind, of the type of which the operation is based on the known principle of the Wheatstone bridge. These devices usually comprise two chambers fed independently from a common source with gas under pressure through restricted passages and one of which has a reference outlet, while the other one is provided with the above-mentioned gauging outlet; said chambers are separated by a pressure responsive member adapted to perform a functional operation, such as actuating an index, establishing elertric contacts, etc. in response to upsetting of the fluent pressure equilibrium between the chambers due to variations of the gauging passage.

Most of the known pneumatic gauges of this kind lack sensitivity and their operation remains more or less influenced by variations of their feeding pressure.

The present invention is a continuation-in-part of my pending application, Serial No. 467,553, filed November 8, 1954, (abandoned).

The main object of the invention is to provide a pneumatic gauge of the type described, wherein the separating member responsive to upsetting of the pressure equilibrium between the two chambers is constituted by a pliable diaphragm, this term meaning in the present specification as well as in the appended claims, a diaphragm with practically no elastic force tending to resist its change of configuration under the action of the pressure differences; to this effect, independently of its actual design which is preferably such, in terms of its material shape, thickness, surface, etc., that it offers high flexibility with a minimum of elasticity, the said diaphragm is disposed between two arresting surfaces adapted to limit its changes of configuration within a range in which it remains substantially free of tensional strains.

With this arrangement, it is clear that the said pliable diaphragm is neutral in any position, provided that it is subjected on both sides of equilibrium forces; in other words, its operation does not depend on the absolute value of the feeding pressure, so that the same may be varied, at will, or due to non-uniformity of the feeding source, without introducing errors in the behavior of the diaphragm. Furthermore, in the apparatus based on a well-defined elasticity of a diaphragm, one has the drawback of finding said elasticity changing with time.

Another object of the invention is to provide such a pneumatic gauge wherein the changes of configuration of the pliable diaphragm are used to vary directly, i.e., without the aid of any electrical or similar relay device, the cross section of one of the passages defining the conditions of flow through the apparatus and wherein the actuation of the control means, interposed to this effect between the pliable diaphragm and the said variable passage, is used, in turn, to perform the required functional operation.

This arrangement offers a number of advantages.

In particular, the said control means may be designed in the most simple mechanical forms. They are actuated progressively within the range of the changes of configuration of the pliable diaphragm, so that their actuation is a continuous function of the cross section of the passage formed between the object to be gauged and the gauging outlet or, in other words, of the distance between said object and outlet. Moreover, due, in particular, to the very nature of its above-defined pliable diaphragm, the pneumatic gauge according to the invention is extremely sensitive and is not subjected to any hunting effect.

A more specific object of the invention is to provide a pneumatic gauge of the type defined, wherein the control means interposed between the diaphragm and the variable passage are constituted by a mere frusto-conical needle freely displaceable in an axial direction in a circular opening and forming therewith the said variable passage.

With this arrangement, if a small angle of conicity is chosen, considerable axial displacements of the needle will correspond to comparatively small variations of the passage cross section thus, so to speak, ensuring amplification of the latter.

Still another object of the invention is to provide a non-positive connection between the above-described needle and the pliable diaphrgam, the said needle bearing by a base of substantial area on the said diaphragm and being urged towards the latter by a force other than the pneumatic fluent pressures used in the apparatus, the action of said force being negligible with respect to the differential action of the said pressures. This permits, in particular, mounting the needle with a perfect guiding without any risk of jamming under the action of the diaphragm. This also permits designing the needle in two parts, the operative one of which, i.e., that which is provided with a frusto-conical portion cooperating with the variable passage, merely abutting on the other one, so that it may be easily removed for cleaning or renewal purposes.

A further object of the invention is to provide a pneumatic gauge as described hereabove with more than four restricted passages, permitting to adapt the pneumatic gauge to a wide variety of gauging, calibrating, measuring and controlling purposes.

Other objects and advantages of the invention will be apparent from the specification and claims.

In the accompanying drawing:

FIG. 3 is a diagrammatical view with parts broken away of another embodiment in which a pneumatic gauge is fed selectively at two different pressures, this embodiment being adapted to the measure of inner diameters of rings or the like.

FIG. 4 is a cross-sectional view along line 4—4 of FIG. 3.

FIG. 5 is a detail view of FIG. 3 showing the method used for measuring ring inner diameters.

FIG. 6 diagrammatically shows a pneumatic gauge according to the invention adapted to the measure of angles of conicity, and FIG. 7 is a diagrammatical view with parts broken away of an alternative embodiment, wherein the variable passage controlled by the needle of the pneumatic gauge is the inlet of one of the gas chambers.

Figure 1:
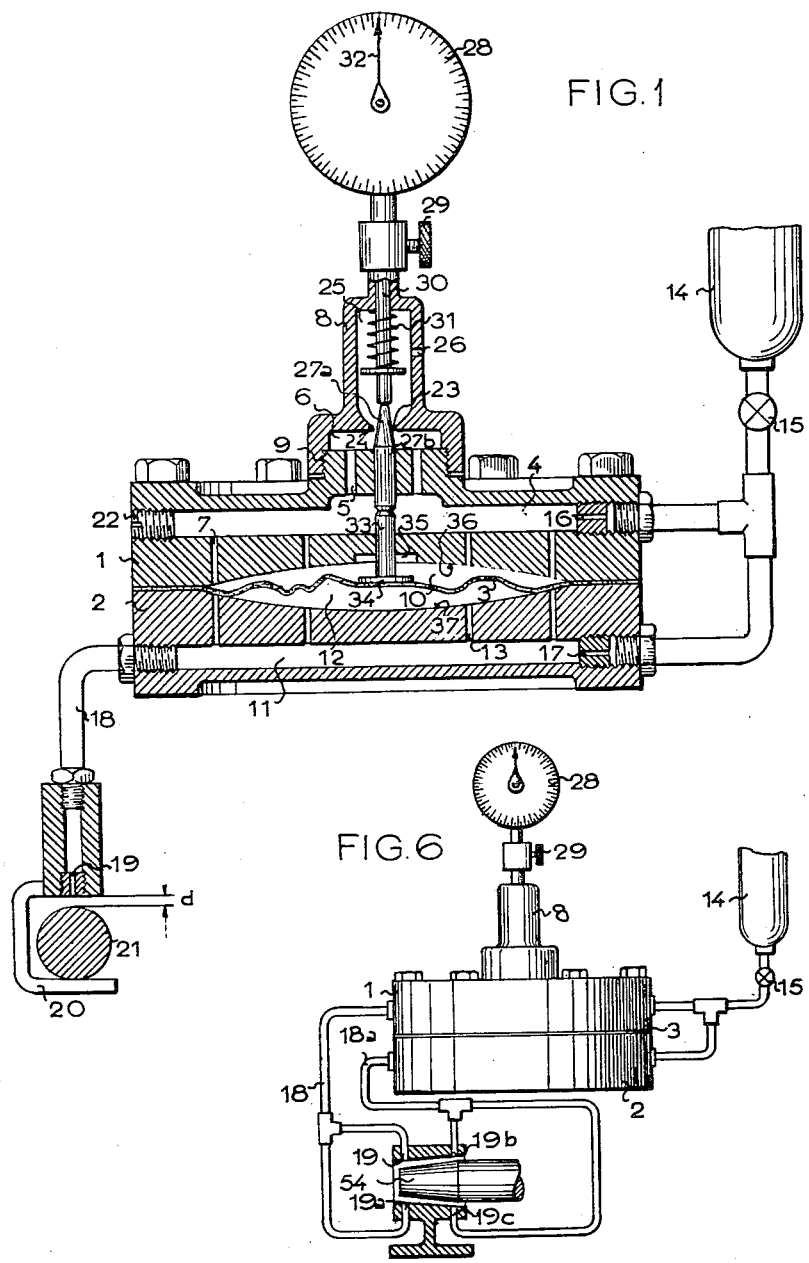
FIG. 1 is a longitudinal sectional view of a pneumatic gauge according to the invention provided with a micrometric comparator.

In the embodiment shown in FIG. 1, the pneumatic gauge according to the invention comprises a casing made of two parts 1, 2, between which is clamped the marginal portion of a diaphragm 3, circular in the example shown, separating a hollow space formed in the casing 1, 2, into two chambers.

In the drawing, the upper one of the said chambers comprises a duct 4 drilled through the upper casing part 1, an upper compartment 6 provided in a supporting member 8 screwed at 9 on the said casing part 1 and the space 10 situated between the diaphragm 3 and the said casing part 1. Suitable ports 5 and 7 provide communication between the spaces 4, 6 and the upper gas chamber 10.

Similarly, the lower gas chamber comprises a duct 11 drilled through the lower part 2 of the casing and space 12 formed between the diaphragm 3 and the said casing lower part 2, ports 13 being provided to establish communication between the duct 11 and the space 12 of the said lower gas chamber. Both chambers are fed in parallel from a common source of compressed gas, such as the gas flask 14, under the control of suitable valve means such as a cock 15. The ducts 4 and 11 of the upper and lower gas chambers, respectively, are fed through calibrated inlets 16 and 17, respectively.

In this embodiment, the duct 11 of the lower chamber communicates through a pipe 18 with a gauging head provided with a calibrated outlet 19 and comprising means such as the bracket 20 for associating with said outlet 19 an object to be gauged, such as a shaft 21 of which, for example, the diameter is to be checked. For this purpose, the object to be gauged should be placed at a small distance $d$ from the outlet 19, so that variations of the said distance are capable of influencing the gas pressure in the lower chamber of the pneumatic gauge, as described hereunder.

The duct 4 of the upper chamber is closed, in this embodiment, by a threaded plug 22. The outlet of the said chamber is constituted by a variable restricted passage 23 provided between a valve needle 27a—27b and a circular hole 24 provided in the top wall of the compartment 6 to communicate the same with the remaining portion 25 of the inner space of the supporting member 8, the same communicating in turn with atmosphere through a vent 26. The valve needle 27a—27b comprises an active frusto-conical portion 27a, of which the axial displacements in the hole 24 determine variations of the cross section of the annular passage therebetween and a cylindrical portion 27b freely guided in a central bore of the top wall of the casing part 1.

In the example shown, a micrometric comparator 28 is removably mounted by means of a screw 29 on the supporting member 8 and the shank 30 of the said comparator bears on the upper end of the needle 27a—27b under the action of a light spring 31. Thus, the index 32 of the comparator gives a measure of the axial position of the needle and, hence, of the cross section of the annular passage between the same and the hole 24. As shown in FIG. 1, the needle 27a—27b bears on the diaphragm 3 under the action of the above-mentioned spring 31 through a mushroom-shaped member including a rod 33 and a flat and comparatively large head 34, the lower face of the said head 34 bearing freely on the diaphragm 3 to which it is not secured.

Thus the mushroom-shaped member 33—34 may be perfectly guided in the bore of the casing part 1 without any risk of jamming upon actuation by the diaphragm 3 as described hereunder. A recess 35 is provided in the lower face of the casing part 1 to receive the mushroom-head 34 to permit the diaphragm 3 to be brought into its uppermost position.

The diaphragm 3 is made of an extremely flexible but practically non-elastic material, such as thin leather, so as to be easily pliable and its changes of configuration under the action of the pressure differences are limited by two arresting surfaces constituted, in the example shown, by concave spherical walls 36 and 37 of the upper and lower parts 1 and 2, respectively, of the casing. In FIG. 1, the spacing of these arresting surfaces has been considerably exaggerated to make the arrangement more easily understood. In practice, the real spacing would be of the order of that shown in FIG. 2, for example. According to a preferred constructive embodiment, the active area of the diaphragm 3 is taken equal to the area of the concave walls 36—37 so that in its both extreme positions, the diaphragm 3 bears on the said walls without being subjected to any tensional strain, but also without being folded. In any position intermediate between the said extreme positions, the diaphragm 3 folds as shown in an exaggerated manner in FIG. 1.

This device operates as follows:

For a well-defined distance $d$ between the outlet 19 and the shaft 21 and for a well-defined axial position of the frusto-conical needle portion 27a, the fluent gas pressures in both chambers are in equilibrium. This state of equilibrium is shown in FIG. 1. In these conditions, the diaphragm 3 is subjected on both faces to the same fluid pressure, so that it could assume any configuration between its arresting surfaces. However, the head 34 exerts on the central portion of the diaphragm 3, a slight mechanical pressure resulting from the action of the spring 31. This slight mechanical pressure is automatically compensated by a fluid pressure increase of equal and opposite action in the lower gas chamber, which presses the central portion of the diaphragm 3 against the head 34. The value of the force exerted by the spring 31 is, however, negligible with respect to the action of the fluent gas pressures, so that it does not practically influence the position of the needle 27a which is thus, for all practical purposes, an accurate measure of the distance $d$; this measure is indicated on the comparator 28 by the index 32.

If, now, the distance $d$ is decreased, for example due to substitution of another shaft of slightly bigger diameter than that of the initial shaft 21, the fluent pressure in the lower chamber will increase thus upsetting the pressure equilibrium between both faces of the diaphragm 3. Thus, the configuration of the said diaphragm will change and lift the needle 27a—27b through the mushroom-member 33—34. The resulting upwards axial shift of the frusto-conical portion 27a determines a reduction of the cross section of the axial passage between the said frusto-conical portion and the edge of the circular hole 24, which results in increasing the fluent pressure in the upper chamber until the pressure equilibrium between both chambers is resumed. The new position of the needle will be indicated by the index 32 on the comparator 28.

With this arrangement, it is clear that for any value of the distance $d$, there will be a well-defined position of the needle and, hence, of the index 32 within the range of the possible changes of configuration of the diaphragm 3. In other words, the position of the index 32 is a continuous function of the distance $d$ in the interval corresponding to the above-mentioned range of the diaphragm changes of configuration.

Figure 2:
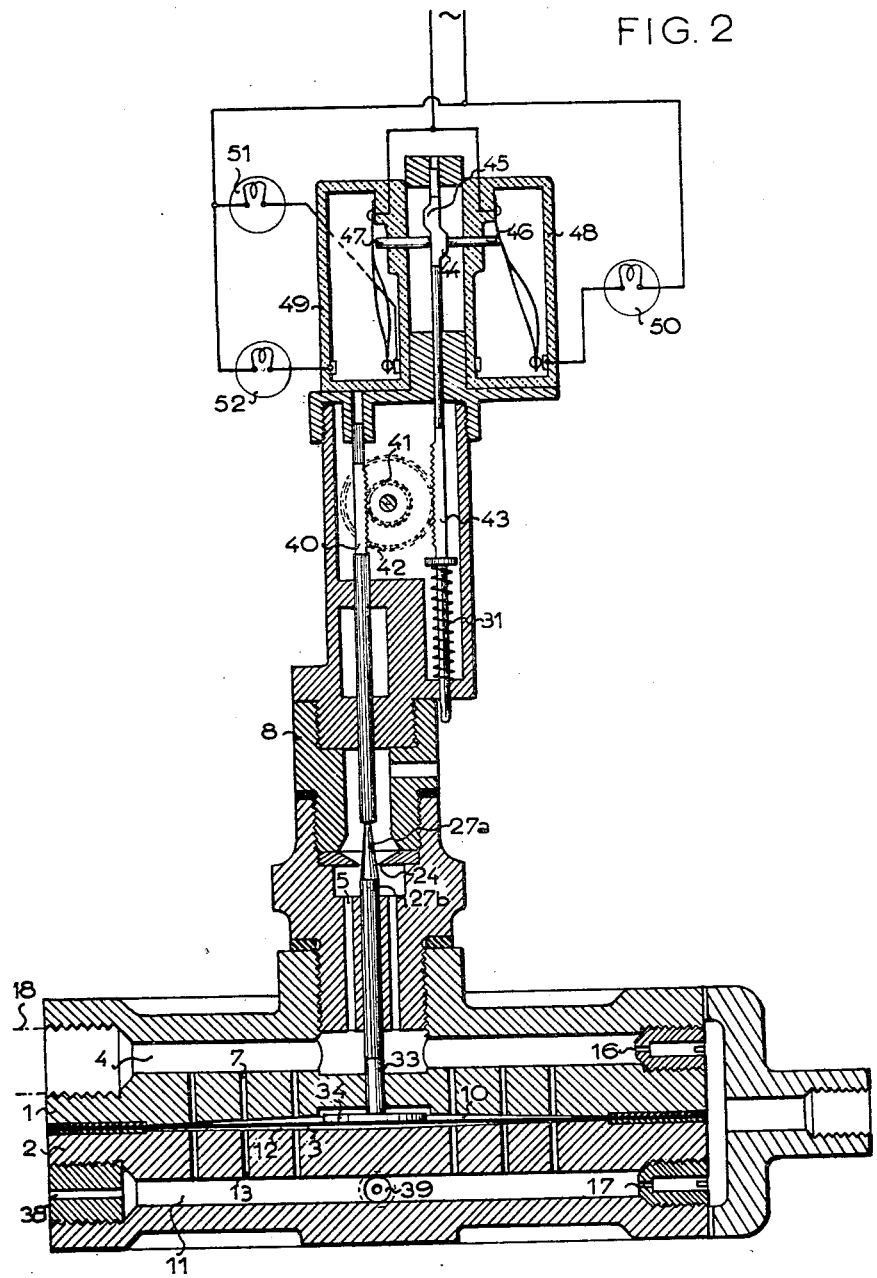
FIG. 2 is a diagrammatical and sectional view, similar to FIG. 1, of another embodiment in which the pneumatic gauge according to the invention is used for controlling micro-switches.

In the alternative embodiment shown in FIG. 2, the gauging head is fed through the pipe 18 in parallel with the variable restricted passage between the frusto-conical needle portion 27a and the circular edge 24. On the other hand, the lower chamber is provided with a main reference restricted outlet 38 completed if desired by any additional outlet 39 which may be obturated for the purpose indicated hereunder by means of a plug shown in dotted line.

With this arrangement, the fluid pressure in the lower chamber may be selectively given two reference values, which permits effecting measures within two different ranges of measurement. It is clear furthermore that instead of the plug, the additional outlet 39 can be provided with a series of calibrated nozzles to permit selective measurements in any desired number of predetermined ranges of measurement. Otherwise, the design and operation of the device are similar in both embodiments.

It is to be noted that thanks to the fact that it bears on the diaphragm not directly but through the mushroom-member 33—34, the needle 27a—27b may be easily removed in order to be cleaned or replaced upon mere unscrewing of the supporting member 8.

In the example of FIG. 2, the needle 27a—27b acts on a rack 40 meshing with a pinion 41 rotatively fast with a toothed wheel 42 meshing with a second rack 43 continuously subjected to the action of the spring 31 and carrying cam surfaces 44—45, respectively cooperating with the push contacts 46—47 of two micro-switches 48—49. The micro-switch 48 is interposed in a control electrical circuit such as the feeding circuit of a lamp 50. The micro-switch 49 is a two-way switch. In each one of its two positions, it selectively completes one of two control electrical circuits, such as those of two lamps 51—52.

This device operates as follows:

It will be assumed that the gauge is used for classifying objects in three batches, viz: a batch of objects having a size comprised within two well-defined limits, a second batch comprising the over-sized objects and a third batch made with the undersized objects.

The axial length of the cam surface 44 will be so chosen that the micro-switch 48 remains closed for all the positions of the needle 27a—27b corresponding to a size of the objects gauged comprised within the said chosen limits. In these conditions, when the gauging head fed through the pipe 18 is presented with an object of accepted size, the micro-switches 48 and 49 will remain in the position shown in FIG. 2 in which both lamps 50 and 51 are illuminated. When an object of insufficient size is presented to the gauging head, the pressure in the upper chamber of the gauge is reduced thus causing a lift of the needle valve until the corresponding reduction of the cross section of the annular passage controlled by the needle frusto-conical portion, is sufficient to establish pressure equilibrium between both chambers. The lifting of the needle lowers the cams 44—45, so that the first one is no more in registration with the push contact 46 which causes opening of the micro-switch 48 in a known manner, while the cam 45 is brought into registration with the push contact 47, thus switching the micro-switch 49 into the position opposite to that shown in FIG. 2, thereby interrupting the circuit of the lamp 51 while establishing that of the lamp 52. Thus, for insufficient size of an object, only the lamp 52 is illuminated. Conversely, for an over-sized object, the needle is lowered while the cams 44 and 45 are lifted, which causes interruption of the circuit of the lamp 50, while that of the lamp 51 is maintained completed. Thus, for an over-sized object, only the lamp 51 is illuminated.

It is to be understood that the lamp system described above, has been given as a mere illustration and that it is possible, within the scope of the invention, to perform any functional operation by incorporating the above described micro-switches in control circuits of any type, e.g., for adjusting, stopping or starting a machine tool in function of the dimension of the workpiece.

In the embodiment of FIG. 3, the lower gas chamber is designed in the same manner as in FIG. 2, and FIG. 4 shows how three outlets 38, 39 and 39a, all fed in parallel, may be easily provided in the said lower chamber. In this embodiment, the gauging head is provided with two diametrically opposed restricted outlets 19 and 19a (FIG. 5) fed in parallel through the pipe 18; such a head permits easily comparing the inner diameter of a ring such as 53 with a standard ring. FIG. 5 illustrates the manner in which the said inner diameter is compared. The diameter D of the head being accurately known, the sum $D+d_1+d_2$ of the said head diameter and the distances of the outlets 19 and 19a respectively from the inner surface of the ring, gives the required comparison of the inner diameter of said ring. However, as known, this type of measuring requires that the pressure of the gas blown out of the outlets 19 and 19a be at least equal to two atmospheres. For this purpose, a source 14a of gas compressed to a sufficient value is substituted for the lower pressure source 14 used for ordinary measurements. Lateral displacement of the ring 53 at right angles to the direction of the slit connecting the two outlets 19 and 19a does not in practice appreciably modify the two distances $d_1$ and $d_2$.

Now, thanks to the use of the diaphragm 3, the operation of which does not depend upon any elastic action, it is possible to combine both HP and LP sources 14a and 14 as shown in FIG. 3, suitable control valve means 15, 15a being provided to permit selective switching of either one of the said sources according to the type of measuring to be effected.

FIG. 6 shows a gauge according to the invention adapted to the comparison of angles of conicity. For this purpose, a measuring sleeve is provided with two sets of diametrically opposed restricted outlets 19—19a and 19b—19c, respectively cooperating with two axially spaced cross sections of the conical part 54 to be gauged. In the embodiment of FIG. 6, one set of outlets, 19—19a, is fed in parallel through the pipe 18 from the upper gas chamber of the gauge, while the other set of outlets 19b—19c is fed in parallel through another pipe 18a from the lower gas chamber of the gauge. The inner surface of the gauging sleeve is given a frusto-conical shape, the angle of conicity of which is used as a reference value. In these conditions, if the angle of conicity of the part 54 is equal to the reference value, the pressure in both gas chambers will be in equilibrium. On the contrary, if the angle of conicity is larger than the reference value, the pressure in the upper chamber will exceed that in the lower chamber, while conversely, if the angle of conicity is smaller than the reference value, the pressure in the lower chamber will exceed that in the upper chamber.

FIG. 7 shows an alternative embodiment in which the needle controls the inlet of the upper chamber. In this embodiment, the frusto-conical portion 27a of the needle is reversed with respect to the other embodiments so that the lifting of the needle causes increase of the cross section of the annular inlet and hence, increase of pressure in the upper chamber, and vice-versa.

What is claimed is:

1. In a pneumatic gauge comprising a casing having a pair of separate gas chambers therein and means for admitting a restricted flow of gas under pressure into each of said chambers, the combination of a pressure sensitive wall common to said chambers and consisting of pliable substantially non-elastic folding material, a pair of perforated concave members having a permanent fixed relationship relative to the neutral position of said folding wall to thereby limit the displacement thereof, the surface area of said wall adapted to engage the surface of one or the other of said concave members conforming to said surface when abutting against the latter whereby substantially no tension results in said wall when in the abutting position, one of said chambers having an outlet adapted to be disposed in proximity to a surface to be gauged, and the other chamber having an outlet adapted to receive a valve therein, said valve being connected with said folding wall for movement therewith to vary the rate of discharge of gas from its corresponding chamber in accordance with the displacements of the wall, and indicating means having a movable element, said element being connected for movement with said valve.

2. In a pneumatic gauge comprising a casing having a pair of separate gas chambers therein and means for admitting a restricted flow of gas under pressure into each of said chambers, the combination of a pressure sensitive wall common to said chambers and consisting of folding substantially non-elastic material, a pair of perforated concave members having a permanent fixed relationship relative to the neutral position of said folding wall to thereby limit the displacement thereof, the surface area of said wall adapted to engage the surface of one or the other of said concave members conforming to said surface when abutting against the latter whereby substantially no tension results in said wall when in the abutting position, one of said chambers having an outlet adapted to receive a spring loaded valve therein, and at least one of said chambers having an outlet adapted to be disposed in proximity to a surface to be gauged, said valve being engageable by said folding wall so as to be moved by said wall against the action of said spring to thereby vary the rate of discharge of gas from its corresponding chamber in accordance with the displacements of the wall, and indicating means having a movable element, said element being connected for movement with said valve.

3. A pneumatic gauge according to claim 2, wherein said valve is constituted by a needle bearing on said folding wall, and wherein said spring urges said needle towards said folding wall with a force independent of the gas pressures and the action of which on said wall is negligible as compared with the differential action of the gas pressures in the chambers.

4. A pneumatic gauge according to claim 3, wherein said needle is made of two separate parts, one of which is provided with a frusto-conical portion cooperating with the outlet of the first one of said chambers to form a variable passage and the other one of which is constituted by a mushroom-shaped member, the head of which bears freely on the said wall without being secured thereto and the shank of which is in abutment relationship with the first of said parts.

5. A pneumatic gauge according to claim 2, wherein the first one of said chambers comprises a second outlet constituted by a restricted passage adapted to be disposed at a short distance from an object to be gauged, and the second one of said chambers having at least one calibrated outlet.

6. A pneumatic gauge according to claim 5, wherein said calibrated outlet is constituted by an interchangeable plug provided with a calibrated bore whereby the said plug may be replaced when desired by another one of different calibration.

7. A pneumatic gauge according to claim 5, comprising a cylindrical gauging head provided with two restricted passages opening in the periphery of the cylindrical gauging head, in diametrically opposed relationship with each other, said restricted passages being fed in parallel from the first one of said chambers.

8. A pneumatic gauge according to claim 2, wherein the first one of said chambers comprises a second outlet, the outlet of the second one of said chambers and said second outlet feeding in parallel two restricted passages opening in a hollow frusto-conical sleeve in diametrically opposed relationship with each other, both pairs of restricted passages being adapted to be disposed near a frusto-conical part, the angle of conicity of which is to be gauged, the respective pairs of restricted passages cooperating with two axially spaced cross sections of the said part.

9. A pneumatic gauge according to claim 2, wherein said indicating means includes at least one switch interposed in an electrical circuit.

References Cited in the file of this patent

UNITED STATES PATENTS

| | | |
|---|---|---|
| 2,486,052 | Moore | Oct. 25, 1949 |
| 2,516,932 | Wainwright | Aug. 1, 1950 |
| 2,571,557 | Fortier | Oct. 16, 1951 |
| 2,820,473 | Reiners | Jan. 21, 1958 |
| 2,859,768 | Teague | Nov. 11, 1958 |
| 2,779,188 | Meyer | Jan. 29, 1957 |

FOREIGN PATENTS

| | | |
|---|---|---|
| 1,116,211 | France | Jan. 30, 1956 |